United States Patent
Kwon et al.

(10) Patent No.: US 8,705,393 B2
(45) Date of Patent: Apr. 22, 2014

(54) APPARATUS AND METHOD FOR COMMUNICATING DATA USING SEQUENTIAL RESPONSE PROTOCOL

(75) Inventors: Ui Kun Kwon, Hwaseong-si (KR); Young Soo Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 248 days.

(21) Appl. No.: 13/093,944

(22) Filed: Apr. 26, 2011

(65) Prior Publication Data
US 2011/0267971 A1  Nov. 3, 2011

(30) Foreign Application Priority Data

Apr. 28, 2010  (KR) .................. 10-2010-0039552

(51) Int. Cl.
*H04W 4/00*  (2009.01)
(52) U.S. Cl.
USPC ............ 370/252; 370/328; 370/330; 370/345
(58) Field of Classification Search
USPC .......... 370/252, 328, 330, 329, 345; 455/450, 455/452.2
See application file for complete search history.

(56) References Cited

U.S. PATENT DOCUMENTS

| | | | |
|---|---|---|---|
| 6,363,054 B1 * | 3/2002 | Saitoh | 370/248 |
| 8,532,010 B2 * | 9/2013 | Lee | 370/312 |
| 2004/0266451 A1 | 12/2004 | Stolyar et al. | |
| 2005/0220145 A1 * | 10/2005 | Nishibayashi et al. | 370/474 |
| 2005/0285719 A1 * | 12/2005 | Stephens | 340/10.2 |
| 2007/0116022 A1 * | 5/2007 | Kwon et al. | 370/401 |
| 2008/0146241 A1 | 6/2008 | Das et al. | |
| 2010/0248635 A1 * | 9/2010 | Zhang et al. | 455/63.1 |
| 2011/0149882 A1 * | 6/2011 | Gong et al. | 370/329 |

FOREIGN PATENT DOCUMENTS

| | | |
|---|---|---|
| KR | 10-2007-0062679 | 6/2007 |
| KR | 10-2008-0040796 | 5/2008 |
| KR | 10-2008-0055310 | 6/2008 |

* cited by examiner

*Primary Examiner* — Rasheed Gidado
(74) *Attorney, Agent, or Firm* — NSIP Law

(57) ABSTRACT

Provided is a data communication method and apparatus based on a sequential response protocol that is applicable to a multiple user multiple input and multiple output (MU-MIMO) system. The data communication apparatus may include response indexes (RIs) with respect to multiple terminals in at least one spatio-temporal stream to be transmitted to the multiple terminals, and the response indexes may be information associated with a transmission sequence of data to be transmitted by the multiple terminals.

8 Claims, 8 Drawing Sheets

APPARATUS AND METHOD FOR COMMUNICATING DATA USING SEQUENTIAL RESPONSE PROTOCOL

CROSS-REFERENCE TO RELATED APPLICATION(S)

This application claims the benefit under 35 U.S.C. §119(a) of Korean Patent Application No. 10-2010-0039552, filed on Apr. 28, 2010, in the Korean Intellectual Property Office, the entire disclosure of which is incorporated herein by reference for all purposes.

BACKGROUND

1. Field

The following description relates to a data communication apparatus and method, and more particularly, to data communication apparatus and method that uses a sequential response protocol, and a terminal based on the data communication method.

2. Description of Related Art

Data throughput has been an important matter in wireless communication technologies. As demands on a local area network (LAN) have increased and various applications, including voice/video streaming service and the like, have been developed, data throughput is regarded as an increasingly important matter.

The scheme of expanding the bandwidth of channels may be used to improve data throughput. However, the expanding of the bandwidth of the channels may be limited due to limited frequency resources. Recently, studies on a multiple input and multiple output (MIMO) scheme have been conducted to improve data throughput without increasing frequency resources, and the wireless mobile communication standard 3GPP LTE, IEEE 802.16e, and the wireless LAN standard 802.11n have adopted the MIMO scheme.

The number of users accessing a mobile communication network and the number of applications have increased and thus, user distributions and traffic characteristics between the users have been diversified. Also, attention to Quality of Service (QoS) of services provided between applications and the users has increased. Therefore, there is a desire for multi-access schemes that may flexibly allocate, to the users, data throughput improved by a wide channel bandwidth and the MIMO scheme.

A multiple user multiple input and multiple output (MU-MIMO) scheme has been suggested. According to the MU-MIMO scheme, wireless resources may be shared since a single data communication apparatus simultaneously transmits different signals to a plurality of terminals. The MU-MIMO scheme has been adopted by the next generation mobile communication standard 802.16n and the LTE-Advanced standard, and adapting the MU-MIMO scheme for the next generation wireless LAN standard 802.11n is being considered.

According to the MU-MIMO scheme, a plurality of terminals may share a channel. When the plurality of terminals transmit and receive data via the same channel, the channel may be effectively distributed for the plurality of terminals.

Accordingly, a data communication method using a sequential response protocol and a terminal based on the data communication method, and a data communication method allowing effective use of wireless resources and providing reliable data transmission and reception is desired.

SUMMARY

In one general aspect, there is provided a reference terminal, including: response indexes (RIs) of a plurality of terminals in at least one spatio-temporal stream transmitted to the plurality of terminals, the RIs including information associated with a transmission sequence of responses to be transmitted by the plurality of terminals.

In the reference terminal: each of the plurality of terminals may be configured to increase a packet count, based on a response transmitted from another terminal, and the response is transmitted from a response terminal having an RI corresponding to the packet count.

In the reference terminal, in response to the response not received being from the response terminal, the reference terminal may be configured to transmit, to the plurality of terminals, a filling packet (FP) including information to set the packet count to correspond to the RI of the response terminal.

In the reference terminal, each of the responses may include: channel information estimated by a corresponding terminal, or an acknowledgement (ACK) with respect to data transmitted from the reference terminal.

In the reference terminal, the reference terminal may include an access point (AP).

In another general aspect, there is provided a terminal, including: a receiving unit configured to receive, from a reference terminal, a spatio-temporal stream including a response index (RI), a packet count unit configured to increase a packet count in response to at least one other terminal located in a service coverage of the reference terminal transmitting a response, and a transmission controller configured to perform controlling to transmit a response to the reference terminal in response to the packet count corresponding to the RI.

In the terminal, the receiving unit may be further configured receive, from the reference terminal, a filling packet (FP) including information to set the packet count to correspond to the RI.

In the terminal, the response may include: information estimated by the terminal, or an acknowledgement (ACK) with respect to data received from the reference terminal.

In another general aspect, there is provided a data communication method, the method including: generating response indexes (RIs) of a plurality of terminals located in a service coverage, and transmitting, to the plurality of terminals, a spatio-temporal stream including the RIs, the RIs including information associated with a transmission sequence of responses transmitted by the plurality of terminals.

The method may further include: sequentially receiving the responses from the plurality of terminals, wherein each of the plurality of terminals increases a packet count, based on a response transmitted from another terminal, and wherein the response is transmitted from a response terminal having an RI corresponding to the packet count.

The method may further include transmitting, to the plurality of terminals, a filling packet (FP) including information to set the packet count to correspond to an RI of a response terminal in response to a response not being received from the response terminal.

In another general aspect, there is provided a communication method, including: receiving, from a reference terminal, a spatio-temporal stream including a response index (RI), increasing a packet count in response to at least one other terminal located in a service coverage of the reference terminal transmitting a response, and controlling to transmit a response to the reference terminal in response to the packet count corresponding to the RI.

The method may further include receiving, from the reference terminal, a filling packet (FP) including information to set the packet count to correspond to the RI.

In the method, the response may include: information estimated by the terminal, or an acknowledgement (ACK) with respect to data received from the reference terminal.

In another general aspect, there is provided a system, including: a reference terminal, and a plurality of response terminals, each response terminal including: a receiving unit configured to receive, from the reference terminal, a spatio-temporal stream including a response index (RI), a packet count unit configured to increase a packet count in response to at least one other terminal, among the plurality of response terminals, located in a service coverage of the reference terminal transmitting a response, and a transmission controller configured to perform controlling to transmit a response to the reference terminal in response to the packet count corresponding to the RI.

In the system, each receiving unit may be further configured receive, from the reference terminal, a filling packet (FP) including information to set the packet count to correspond to the RI.

In the system, the response may include: information estimated by the terminal, or an acknowledgement (ACK) with respect to data received from the reference terminal.

In the system, the reference terminal may include an access point (AP).

In the system, the spatio-temporal stream may further include: a legacy signal field (L-SIG), very high throughput (VHT)-SIG field, and a plurality of data fields respectively corresponding to the plurality of response terminals.

In the system, each of the plurality of data fields may include a respective RI, each RI corresponding to a respective response terminal associated with the respective data field.

In the system, each of the plurality of data fields may include padding, such that each data field includes a same length.

In the system, each of the plurality of response terminals may be configured to receive a response to the reference terminal transmitted from each of the other of the plurality of response terminals.

The system may include a multiple user multiple input and multiple output (MU-MIMO) system.

A non-transitory computer readable recording medium may store a program to implement the methods.

Other features and aspects may be apparent from the following detailed description, the drawings, and the claims.

Figure 1:
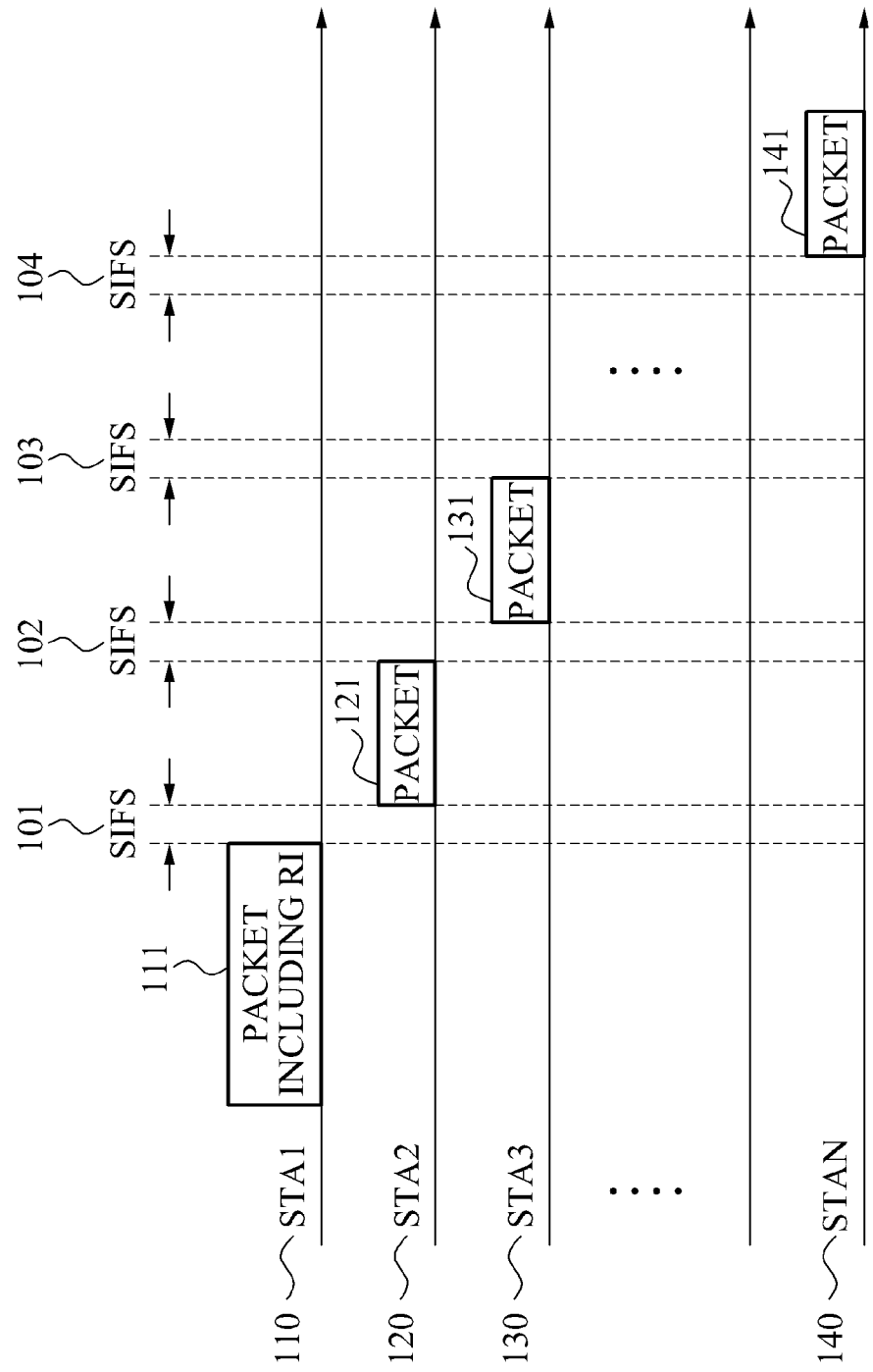
FIG. 1 is a diagram illustrating an example of a data packet transmitting method using a sequential response protocol.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses and/or systems described herein. Accordingly, various changes, modifications, and equivalents of the systems, apparatuses and/or methods described herein may be suggested to those of ordinary skill in the art. The progression of processing steps and/or operations described is an example; however, the sequence of steps and/or operations is not limited to that set forth herein and may be changed as is known in the art, with the exception of steps and/or operations necessarily occurring in a certain order. Also, descriptions of well-known functions and constructions may be omitted for increased clarity and conciseness.

Example embodiments may provide a data communication method using a sequential response protocol and a terminal based on the data communication method. The sequential response protocol may be applicable to all communication systems in which a reference terminal having at least one antenna transmits data to at least one response terminal having at least one antenna.

<Data Communication Based on Sequential Response Protocol>

FIG. 1 illustrates an example of a data packet transmitting method using a sequential response protocol.

When packet transmission is performed between a plurality of terminals, a reference terminal selected from among the plurality of terminals may determine a packet transmission sequence of the plurality of terminals, may express the determined packet transmission sequence as response indexes (RIs), and may transmit the RIs to response terminals. The packet transmission sequence of the plurality of terminals may be referred to as the RIs. Other terminals communicating with the reference terminal in a service coverage of the reference terminal may be referred to as the response terminals. The reference terminal may transmit a data packet, including the RIs, to the response terminals.

The response terminals may receive the data packet, including the RIs, from the reference terminal. According to an aspect of example embodiments, each of the response terminals may increase a packet count based on a number of response packets received from another response terminal, and a response terminal having an RI corresponding to the packet count may transmit a response packet to the reference terminal.

Referring to FIG. 1, a reference terminal (STA1) 110 may generate response indexes (RIs) with respect to N−1 response terminals, for example, a first response terminal (STA2) 120, a second response terminal (STA3) 130, and an N−1$^{th}$ response terminal (STAN) 140. The STA1 110 may transmit a packet 111 which may include the RI, to response terminals, for example, the STA2 120, the STA3 130, and the STAN 140.

It may be presumed in one example that the STA1 110 initiates a packet count as "0". It may be presumed in one example that an RI of the STA2 120 is set to be "0", an RI of the STA3 130 is set to be "1", and an RI of the STAN 140 is set to be N−2.

The response terminals, for example, the STA2 120, the STA3 130, and the STAN 140, may receive the data packet 111 including the RI from the STA1 110. A time expended when the STA1 110 or a response terminal, for example, the STA2 120, the STA3 130, and the STAN 140, changes a mode from a reception mode to a transmission mode, or changes the mode from the transmission mode to the reception mode, may be referred to as a short interframe space (SIFS), for example, an SIFS 101, an SIFS 102, an SIFS 103, and an SIFS 104.

In response to the packet count being initiated as "0", the packet count of the STA2 120 and the RI of the STA2 120 may be the same as "0". Accordingly, the STA2 120 may change a mode to a transmission mode after the SIFS 101, and may transmit a response packet 121.

Other response terminals, for example, the STA3 130 and the STAN 140, that overhear the response packet 121 transmitted from the STA2 120 may increase the packet count to "1".

The RI of the STA3 130, which may be received from the reference terminal 110, may be "1", and the packet count may be "1". Thus, the STA3 130 may change a mode to a reception mode during the SIFS 102, and may transmit a response packet 131. Other response terminals, for example, the STA2 120 and the STAN 140, that overhear the response packet 131 transmitted from the STA3 130 may increase the packet count to "2".

In the same manner, the STAN 140 may transmit a response packet 141 after a corresponding SIFS, e.g., SIFS 104.

Although FIG. 1 illustrates that a response terminal may transmit a corresponding response packet, in response to an RI of the response terminal being the same as the packet count, the response terminal may transmit the response packet, when the RI of the response terminal corresponds to the packet count of the response terminal based on a predetermined rule. For example, the response terminal may transmit the response packet in response to a difference between the RI of the response terminal and the packet count being a predetermined value.

The RI and the initial value of the packet count with respect to each response terminal, for example, the STA2 120, the STA3 130, and the STAN 140; and the difference between RIs of two successive terminals may vary according to conditions.

Figure 2:
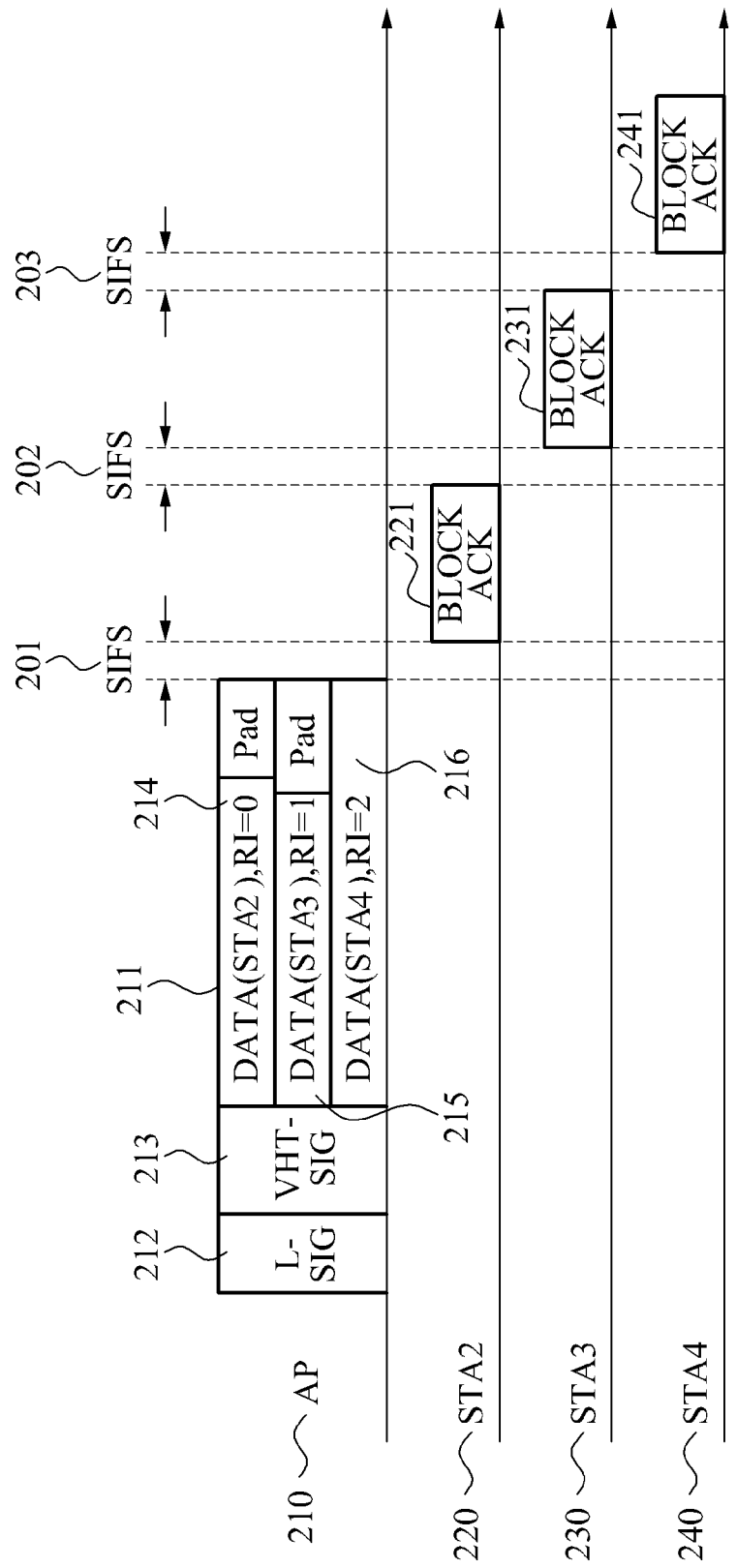
FIG. 2 is a diagram illustrating an example of a data packet transmitting method using a sequential response protocol set in 802.11ac.

FIG. 2 illustrates an example of a data packet transmitting method using a sequential response protocol set in the IEEE 802.11ac standard. The IEEE 802.11ac standard uses a multiple user multiple input and multiple output (MU-MIMO) scheme.

An access point (AP) 210 may transmit a data packet 211 to a plurality of response terminals, for example, a first response terminal (STA2) 220, a second response terminal (STA3) 230, and a third response terminal (STA4) 240. The data packet 211 may include an L-SIG field 212, a very high throughput (VHT)-SIG field 213, and data fields 214, 215, and 216. The data fields 214, 215, and 216 may include padding, for example, to cause each data field to have the same length.

The L-SIG field 212 may denote a legacy signal field. The L-SIG field 212 may include frame length information associated with a length from the VHT-SIG field 213 to the end of the frame.

The VHT-SIG field 213 may be a signal field transmitted for 802.11ac-based terminals that support the MU-MIMO scheme, and data fields 214, 215, and 216 after the VHT-SIG field 213 may be coded in advance and may be transmitted to respective response terminals, for example, the STA2 220, the STA3 230, and the STA4 240. According to an aspect of example embodiments, the data fields 214, 215, and 216 may be coded in advance, based on a space dimension multiple access (SDMA) scheme.

The data fields 214, 215, 216 may include data to be transmitted to response terminals, for example, the STA2 220, the STA3 230, and the STA4 240, and may include IRs with respect to the response terminals, respectively.

Referring to FIG. 2, the RI of the STA2 220 is "0", the RI of the STA3 230 is "1", and the RI of the STA4 240 is "2". Referring to FIG. 2, the AP 210 may transmit RIs to respective response terminals using the single data packet 211.

The RIs with respect to response terminals may denote information associated with a transmission sequence of block acknowledgments (ACKs), for example, a block ACK 221, a block ACK 231, and a block ACK 241, with respect to data, for example, data 214, data 215, and data 216, received from the AP 210.

Referring to FIG. 2, each of the response terminals may overhear a response packet, that is, the block ACK, transmitted from another response terminal located in a service coverage of the AP 210, and may increase a packet count. A response terminal having an RI corresponding to the packet count may transmit a block ACK, after an SIFS, for example, an SIFS 201, an SIFS 202, and an SIFS 203.

Figure 3:
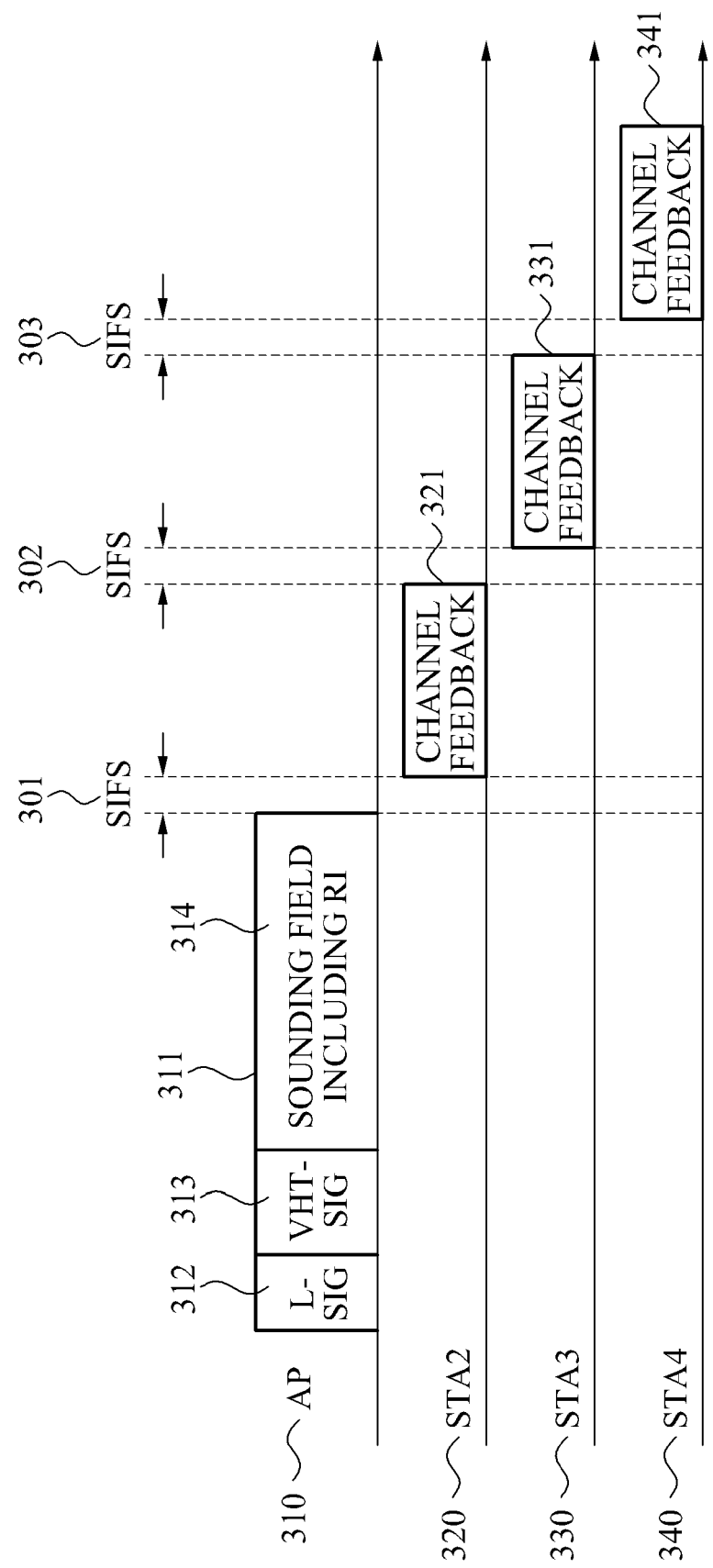
FIG. 3 is a diagram illustrating an example of a channel information obtaining method using a sequential response protocol.

FIG. 3 illustrates an example of a channel information obtaining method using a sequential response protocol. A response terminal transmits, to a reference terminal, channel state information as a response packet.

Referring to FIG. 3, the AP 310 may transmit a data packet 311 to a plurality of response terminals, for example, an STA2 320, an STA3 330, and an STA4 340. The data packet 311 may include an L-SIG field 312, a VHT-SIG field 313, and a sounding field 314 including RIs.

The L-SIG field 312 and the VHT-SIG field 313 may be the same as the L-SIG field 212 and the VHT-SIG field 213 of FIG. 2.

The sounding field 314 may include a sounding signal to enable each response terminal to estimate a channel state between the AP 310 and a corresponding response terminal.

Each response terminal may estimate a corresponding channel state based on the sounding signal, and may feed back, to the AP 310, the estimated channel state information, for example, a channel feedback 321, a channel feedback 331, and a channel feedback 341.

The RIs with respect to the response terminals may denote a feedback sequence of the channel state information to be transmitted by the response terminals that receive the sounding field 314 from the AP 310.

The AP 310 may determine the RIs with respect to the response terminals, and may initiate a packet count with respect to the response terminals. The AP 310 may transmit the determined RIs and the initiated packet count to respective response terminals, A response terminal having an RI corresponding to the packet count may feed back channel state information to the AP 310, after a corresponding SIFS, for example, an SIFS 301, an SIFS 302, and an SIFS 303.

Referring to FIG. 3, each of the response terminals may overhear channel state information fed back to the AP 310 from other response terminals, and may increase the packet count. A response terminal having an RI corresponding to the increased packet count may feed back the channel state information to the AP 310.

<Error Recovery Based on Sequential Response Protocol>

Figure 4:
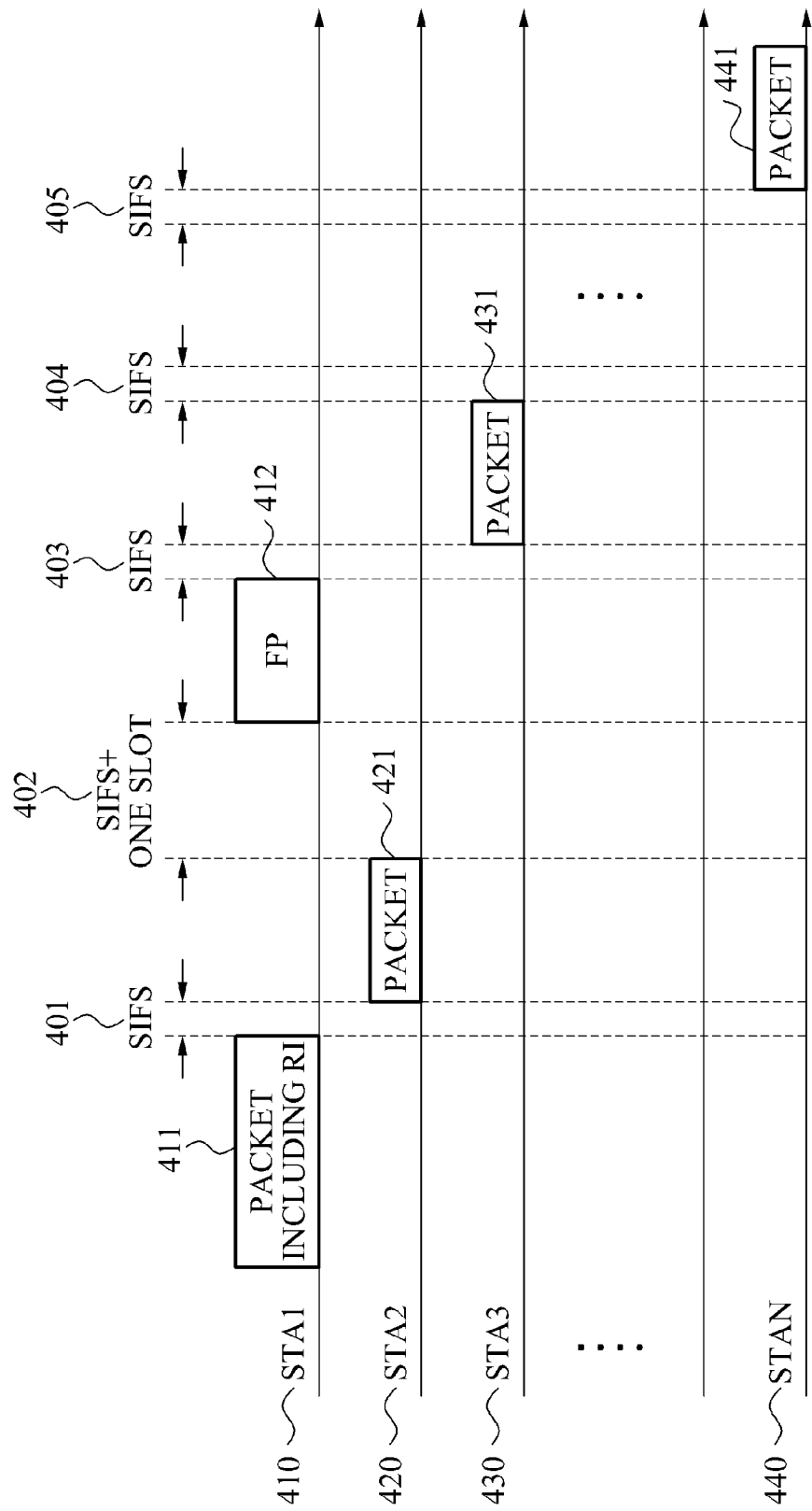
FIG. 4 is a diagram illustrating an example of a recovering method with respect to an error occurring when a sequential response protocol is used.

FIG. 4 illustrates an example of a recovering method with respect to an error occurring when a sequential response protocol is used.

An error may occur during packet transmission and packet reception according to a channel state between a reference terminal (STA1) 410 and each of response terminals, for example, a first response terminal (STA2) 420, a second response terminal (STA3) 430, and an N−1$^{th}$ response terminal (STAN) 440. For example, at least one of the response terminals, for example, the STA2 420, the STA3 430, and the STAN 440, located in a service coverage of the STA1 410 may not receive a packet from the STA1 410 or may not receive the packet during a predetermined time due to an external interference signal. In one example, an error may occur in data communication that is based on the sequential response protocol.

Referring to FIG. 4, in response to an error occurring in the data communication that is based on the sequential response protocol due to a transmission error and the like, the STA1 410 may transmit a filling packet (FP) to recover the error.

The STA1 410 may transmit a data packet 411 including RIs to a plurality of response terminals, for example, the STA2 420, the STA3 430, and the STAN 440. It may be presumed in one example that the STA1 410 initiates a packet count as "0". It may be presumed in one example that the RI of the STA2 420 is set to be "0", and the RI of the STA3 430 is set to be "1". The RI received from the STA1 410 may be the same as the packet count. Thus, the STA2 420 may transmit a response packet 421 after an SIFS 401.

In the example shown in FIG. 4, an error may occur in packet transmission and packet reception of the STA3 430. To perform the data communication based on the sequential response protocol described with reference to FIG. 1, the STA3 430 may transmit a response packet 431. However, other response terminals, for example, the STA2 420 and the STAN 440, may be unable to increase the packet count, due to an error.

In one example, the STA1 410 may wait for reception of the response packet 431 during a predetermined time period. According to an aspect of example embodiments, the STA1 410 may wait for the reception of the response packet 431 during an SIFS and a single time slot 402.

In response to the STA1 410 not receiving the response packet 431 from the STA3 430 during the predetermined time period, the STA1 410 may initiate the packet count to be "1", e.g., the RI of the STA3 430, and may transmit a filing packet 412 including the initiated packet count to each response terminal, for example, the STA2 420, the STA3 430, and STAN 440.

Each response terminal may receive the filing packet 412 having the packet count of "1" and may reset the packet count to be "1". The reset packet count may be the same as the RI of the STA3 430. Thus, the STA3 430 may transmit the response packet 431 after an SIFS 403.

The error occurring during the packet transmission of the STA3 430 may be recovered based on the FP 412. Operation may then continue according to the SIFS 404 and SIFS 405, and the STAN 440 may transmit the packet 441 after the SIFS 405.

Figure 5:
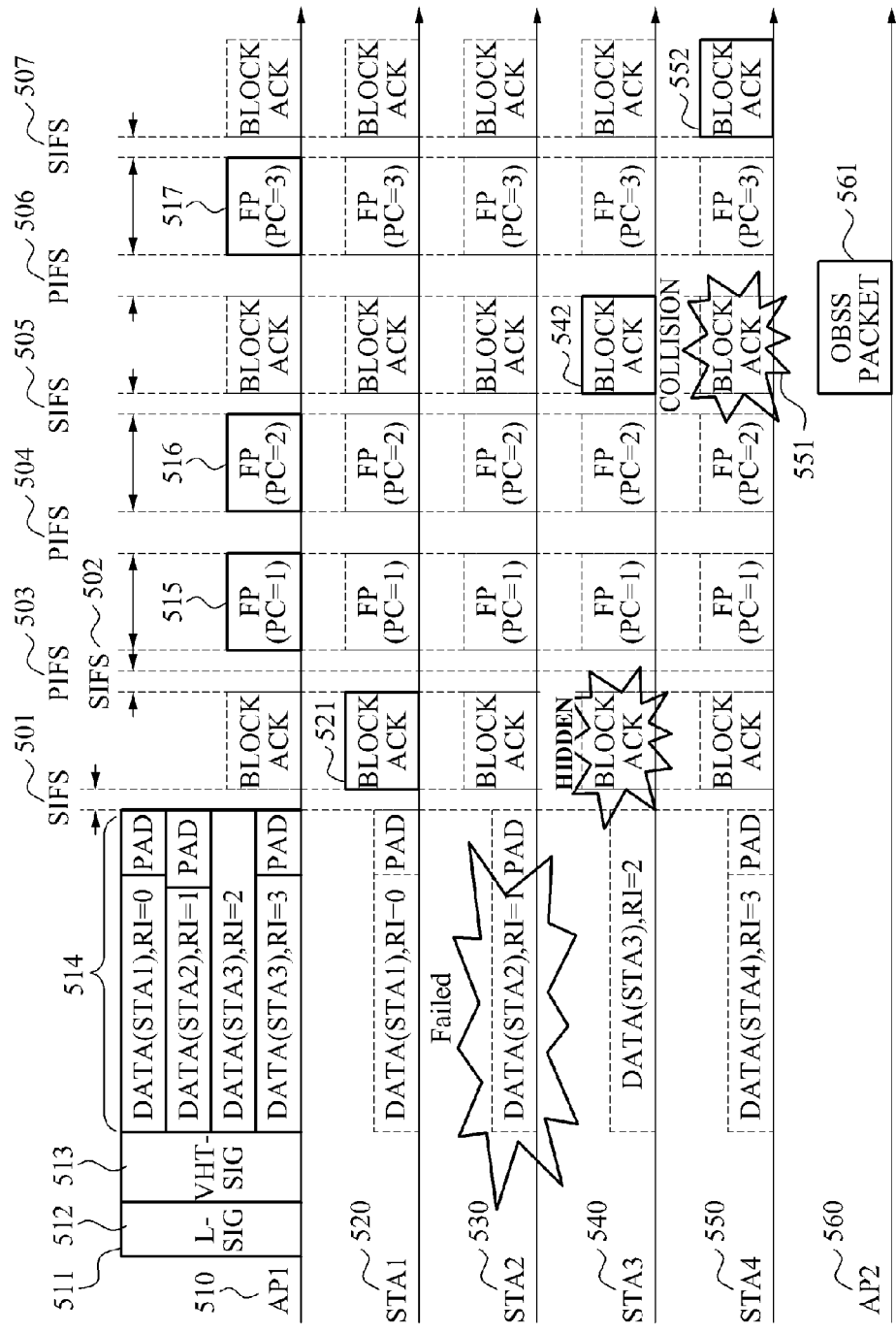
FIG. 5 is a diagram illustrating an example of a recovering method with respect to an error occurring when a sequential response protocol set in 802.11ac is used.

FIG. 5 illustrates an example of a recovering method with respect to an error occurring when a sequential response protocol set in 802.11ac is used.

An error may occur during packet transmission and packet reception between an access point, for example, an AP1 510 and an AP2 560, and response terminals, for example, a first response terminal (STA1) 520, a second response terminal (STA2) 530, a third response terminal (STA3) 540, and a fourth response terminal (STA4) 550, due to various unfavorable conditions in a communication environment.

The AP1 510 may transmit a data packet 511 including RIs and data, for example, data 514, with respect to the four response terminals located in a service coverage, for example, the STA1 520, the STA2 530, the STA3 540, and the STA4 550. The data packet 511 may include an L-SIG field 512 and the VHT-SIG field 513.

The RI of the STA1 520 may be set to "0", the RI of the STA2 530 may be set to "1", the RI of the STA3 540 may be set to "2", and the RI of the STA4 550 may be set to "3". The AP, e.g., the AP1 510 and the AP2 560, may initiate a packet count as "0" and may transmit the initiated packet count to the response terminals.

Referring to FIG. 5, the STA1 520, the STA3 540, and the STA4 550 may successfully receive corresponding data and RIs included in the data packet 511, whereas the STA2 530 may fail to receive corresponding data and an a corresponding RI included in the data packet 511.

Referring to FIG. 5, the STA1 520 that successfully receives the packet 511 may transmit a block acknowledgement (ACK) 521, that is, a response packet, after an SIFS 501. According to the sequential response protocol, even though other response terminals, for example, the STA2 530, the STA3 540, and the STA4 550, that overhear the block ACK 521 transmitted by the STA1 520 increases the packet count to "1", the STA2 530 that fails to receive the data and the RI and the STA3 540 that fails to receive the block ACK 521 transmitted from the STA1 520 may be unable to increase the packet count. The AP1 510 may wait for reception of a packet transmitted from the STA2 530 during a predetermined time (PIFS) 503, and may transmit, to response terminals, for example, the STA1 520, the STA2 530, the STA3 540, and the STA4 550, an FP 515 which includes information to reset the packet count to be "1" that is the same as the RI of the STA2 530.

The response terminals may receive the FP 515, and may reset the packet count to be "1".

In one example, even though the STA2 530 receives the FP 515, the STA2 530 may not have a block ACK to transmit, as the STA2 530 had failed to receive the data and the RI transmitted from the AP1 510. In this example, the STA2 530 may not transmit the block ACK; thus, an error may occur in the sequential response protocol.

In response to the AP1 510 failing to receive the block ACK from the STA2 530 during a PIFS 504, the AP1 510 may transmit an FP 516 including information to reset the packet count to be "2".

The STA3 540 may receive the FP 516, and may transmit a block ACK 542 to the AP1 510 after an SIFS 505, as the packet count is the same as the RI of the STA3 540.

Referring to FIG. 5, even though other response terminals, for example, the STA1 520, the STA2 530, and the STA4 550, may overhear the block ACK 540 transmitted by the STA3 540 to increase the packet count, the STA4 550 may receive an OBSS packet that is an interference signal 561, from the AP2 560 that is an adjacent access point, during a period in which the STA3 540 transmits the block ACK 542. A collision 551 may occur between the received interference signal 561 and the block ACK 542. In one example, the STA4 550 may not overhear the block ACK 542 transmitted from the STA3 540. Therefore, the STA4 550 may not increase the packet count, and may have an error in transmission of a block ACK during a time period after the STA3 540 transmits the block ACK 542.

The AP1 510 may wait for reception of the block ACK 542 transmitted from the STA4 550 during a PIFS 506. In response to the AP1 510 not receiving the block ACK 542 from the STA4 550, the AP1 510 may transmit an FP 517 which includes information to reset the packet count to be "3", to the response terminals, for example, the STA1 520, the STA2 530, the STA3 540, and the STA4 550.

The STA4 550 may receive the FP 517, and may transmit a block ACK 552 to the AP1 510 after the SIFS 507, as the packet count is the same as the RI of the STA4 550.

Referring to FIG. 5, in response to an error occurring in packet transmission and packet reception between each response terminal and the AP1 510, the AP1 510 may recover the error based on an FP including information to reset the packet count.

The error recovery illustrated in FIG. 5 is merely an example, and example embodiments may not be limited thereto. Various errors may occur in various communication environments, and the errors may be recovered by the described error recovery scheme, or a different error recovery scheme.

<Data Communication Method of Reference Terminal and Response Terminal Based on Sequential Response Protocol>

Figure 6:
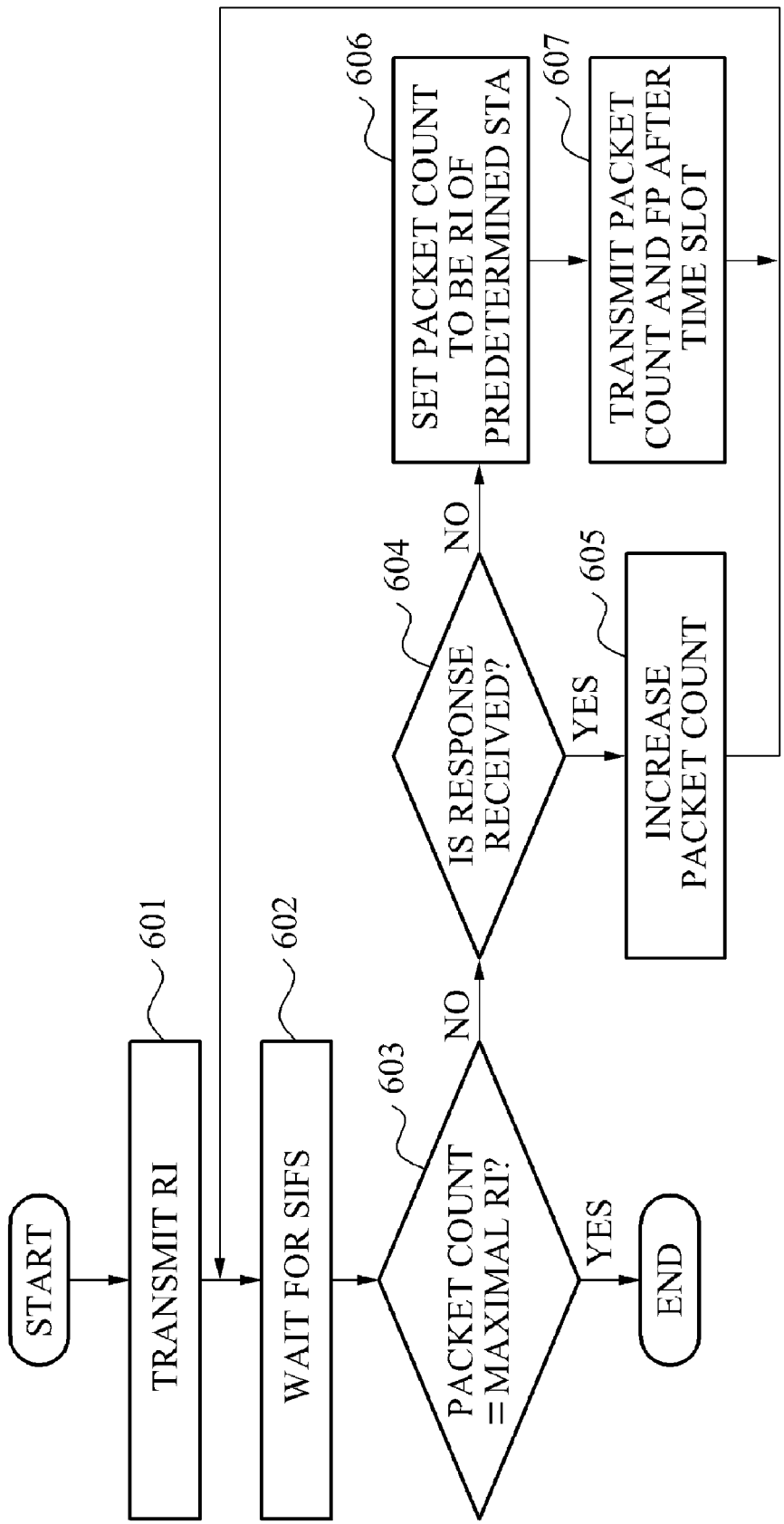
FIG. 6 is a flowchart illustrating an example of a data communication method of a reference terminal.

FIG. 6 illustrates an example of a data communication method of a reference terminal.

In operation 601, a reference terminal may transmit a data packet to each of a plurality of response terminals, the data packet including RIs with respect to the plurality of response terminals. According to an aspect of example embodiments, the reference terminal may determine the RIs with respect to the response terminals based on various schemes. An RI may include information associated with a transmission sequence of response packet to be transmitted by a predetermined response terminal. The transmission sequence may be determined based on a packet count and an RI of the predetermined response terminal.

In operation 602, the reference terminal may wait for reception of a response packet during an SIFS. The reference terminal may change a mode from a transmission mode to a reception mode during the SIFS. The response terminals may change a mode from the reception mode to the transmission mode.

In operation 603, the reference terminal may determine whether the packet count is the same as a maximal RI. In response to the packet count being the same as the maximal RI ("YES" branch), the reference terminal may complete the reception of the response packet.

In response to the packet count not being the same as the maximal RI ("NO" branch), there may exist a response terminal that is to transmit a response packet to the reference terminal. In one example, in operation 604, the reference terminal may determine whether the response packet is received from the response terminal.

After the SIFS, the reference terminal may receive a response packet from each response terminal having an RI corresponding to the packet count. In response to the response packet being received from each response terminal ("YES" branch of operation 604), in operation 605, the reference terminal may increase the packet count, then may return to operation 602 to wait for the SIFS.

In response to the response packet not being received from each response terminal ("NO" branch of operation 604), in operation 606, the reference terminal may set (or reset) the packet count of each response terminal to be an RI of a response terminal from which a response packet is not received. In operation 607, the reference terminal may transmit an FP, including information to reset the packet count, to each response terminal.

Each response terminal may reset the packet count based on the FP transmitted from the reference terminal, and may transmit, to the reference terminal, a response packet based on the reset packet count and the RI.

Figure 7:
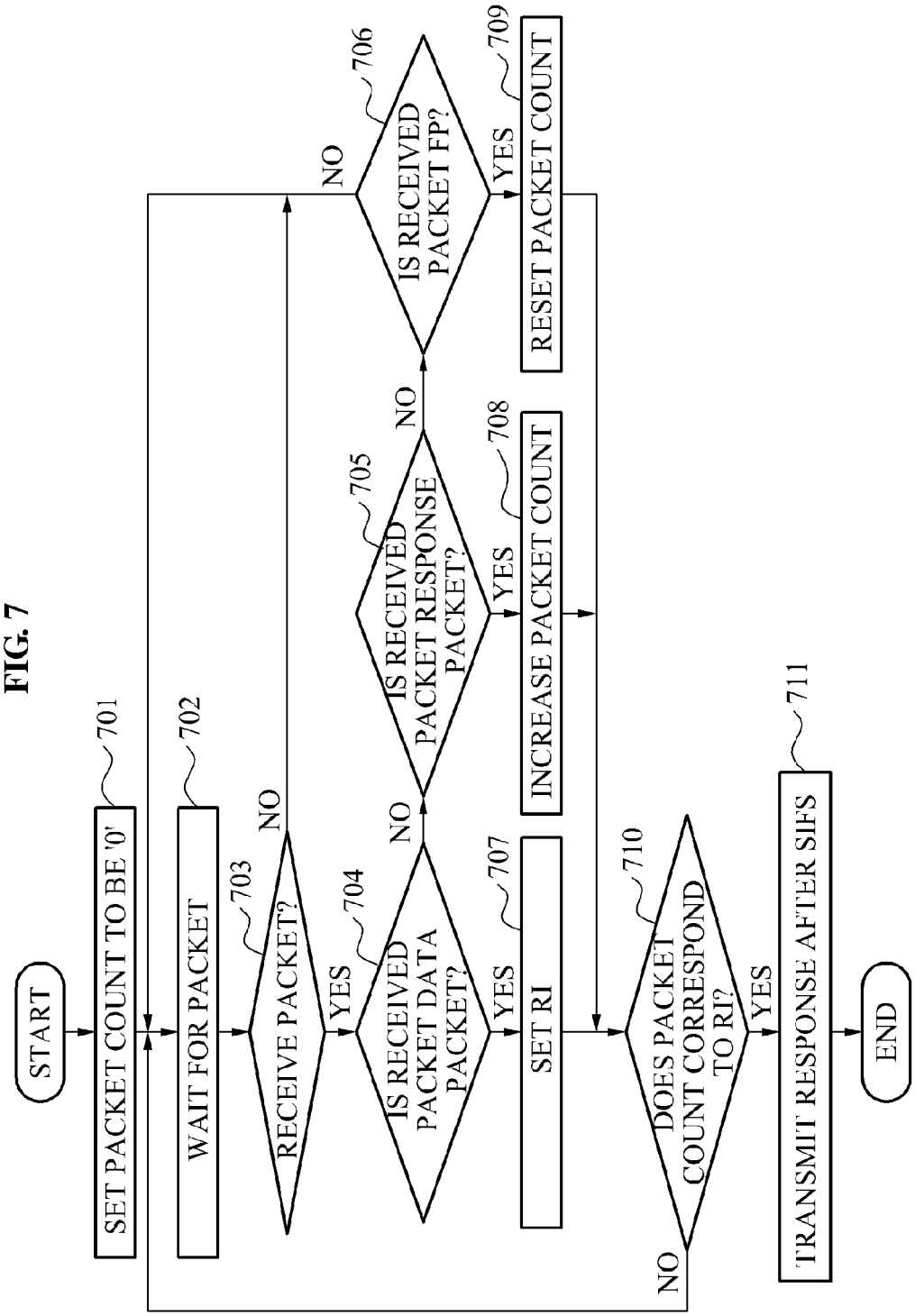
FIG. 7 is a flowchart illustrating an example of a data communication method of a response terminal.

FIG. 7 illustrates an example of a data communication method of a response terminal.

In operation 701, the response terminal may set a packet count to be "0".

In operation 702, the response terminal may wait for reception of one of: a data packet including an RI, which may be transmitted from a reference terminal, a response packet transmitted from another response terminal, and an FP transmitted from the reference terminal.

In operation 703, the response terminal may determine whether the packet is received, and may proceed as below based on a type of the received packet ("YES" branch). Otherwise, the method may loop back on the "NO" branch to continue to wait for a packet to be received.

In operation 704, in response to the received packet being the data packet ("YES" branch), in operation 707, the response terminal may set an RI of the response terminal, based on the RI included in the data packet.

In operation 705, in response to the received packet not being the data packet ("NO" branch of operation 704), in response to the received packet being the response packet ("YES" branch of operation 705), the response terminal may increase the packet count in operation 708.

In operation 706, in response to the received packet not being the data packet ("NO" branch of operation 705), in response to the received packet being the FP ("YES" branch of operation 706), the response terminal may reset the packet count based on information that is to reset the packet count and that is included in the FP in operation 709. In response to the received packet not being the FP ("NO" branch of operation 706), the method may return to operation 702 to wait for a packet to be received.

In operation 710, the response terminal may determine whether the packet count corresponds to the RI of the response terminal. In operation 711, in response to the packet count corresponding to the RI ("YES" branch of operation 710), the response terminal may transmit a response packet to the reference terminal after SIFS. In response to the packet count not corresponding to the RI of the response terminal ("NO" branch of operation 710), the method may return to operation 702 to wait for a packet to be received.

Figure 8:
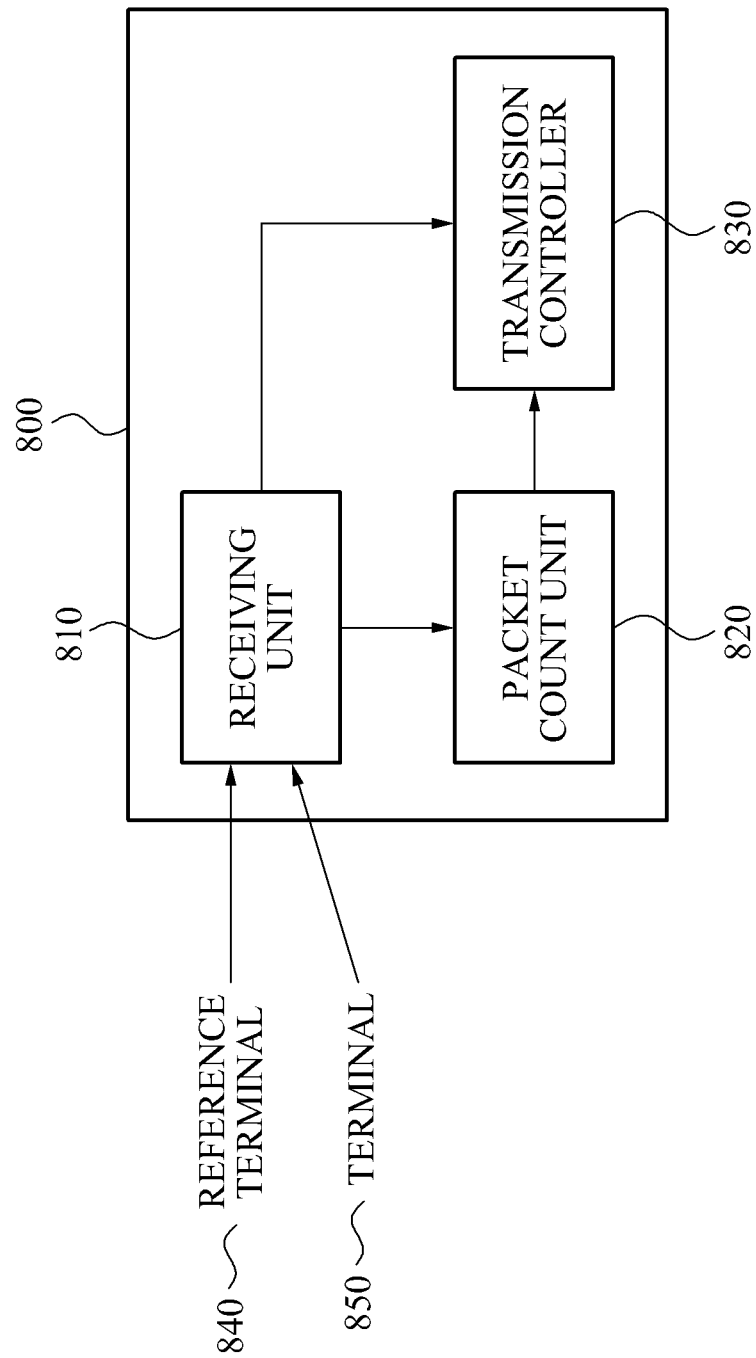
FIG. 8 is a block diagram illustrating an example of a response terminal.

FIG. 8 is a block diagram illustrating an example of a response terminal 800.

The response terminal 800 may include a receiving unit 810, a packet count unit 820, and a transmission controller 830.

The receiving unit 810 may receive a spatio-temporal stream including an RI, from a reference terminal 840. The RI may denote information associated with a transmission sequence of a response packet to be transmitted by the response terminal 800. The reference terminal 840 may initiate a packet count, and may transmit the initiated packet count to the response terminal 800 and to other response terminals, for example, a terminal 850.

The receiving unit 810 may receive a response packet from the terminal 850. The terminal 850 may be located in a service coverage of the reference terminal 840. The terminal 850 may receive a data packet from the reference terminal 840, and may transmit the response packet in response to the data packet. The receiving unit 810 may overhear the response packet that the terminal 850 transmits to the reference terminal 840.

The packet count unit 820 may increase the packet count by overhearing the response packet of the terminal 850.

In response to the packet count corresponding to an RI of the response terminal 800, the transmission controller 830 may perform controlling to transmit a response packet to the reference terminal 840. The response packet may be a block ACK, or may be channel state information associated with an estimated channel state between the reference terminal 840 and the response terminal 800.

In response to the response packet transmitted from the response terminal 800 not being received, the reference terminal 840 may transmit, to the response terminal 800, an FP including information to reset the packet count of the response terminal 800 to correspond to the RI of the response terminal 800 that has a data transmission error. In response to the response packet transmitted from the terminal 850 not being received, the reference terminal 840 may transmit, to the response terminal 850, an FP including information to reset the packet count of the response terminal 850 to correspond to the RI of the response terminal 850 that has a data transmission error.

The receiving unit 810 may receive an FP, and the packet count unit 820 may reset the packet count, based on the FP.

The transmission controller 830 may perform controlling to transmit the response packet to the reference terminal 840, based on the reset packet count.

The processes, functions, methods and/or software described herein may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media, such as hard disks, floppy disks, and magnetic tape; optical media such as CD-ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules that are recorded, stored, or fixed in one or more computer-readable storage media, in order to perform the operations and methods described above, or vice versa. In addition, a computer-readable storage medium may be distributed among computer systems connected through a network and computer-readable codes or program instructions may be stored and executed in a decentralized manner.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A reference terminal in a communication system having a plurality of terminals, the reference terminal comprising:
   response indexes (RIs) of the plurality of terminals that are transmitted to the plurality of terminals in at least one spatio-temporal stream, the RIs comprising information associated with a transmission sequence of responses to be transmitted by the plurality of terminals, wherein:
   each of the plurality of terminals is configured to increase a packet count based on a response, to the transmitted stream, transmitted from another terminal,
   the response is transmitted from a response terminal having an RI corresponding to the packet count, and
   if the response is not received from the response terminal, the reference terminal is configured to transmit, to at least one of the plurality of terminals, a filling packet (FP) comprising information to set the packet count to correspond to the RI of the response terminal.

2. The reference terminal of claim 1, wherein:
   each of the terminals transmits a response, to the transmitted stream, when its respective RI corresponds to the packet count, and
   each of the responses comprises:
   channel information estimated by a corresponding terminal; or
   an acknowledgement (ACK) with respect to data transmitted from the reference terminal.

3. The reference terminal of claim 1, wherein the reference terminal comprises an access point (AP).

4. A terminal, comprising:
   a receiving unit configured to receive, from a reference terminal, a transmitted spatio-temporal stream comprising a response index (RI);
   a packet count unit configured to increase a packet count in response to at least one other terminal, located in a service coverage of the reference terminal, transmitting a response to the transmitted stream; and
   a transmission controller configured to transmit a response to the reference terminal upon the packet count corresponding to the RI, wherein
   the receiving unit is further configured to receive, from the reference terminal, a filling packet (FP) comprising information to set the packet count to correspond to the RI.

5. The terminal of claim 4, wherein the response transmitted by the terminal comprises:
   information estimated by the terminal; or
   an acknowledgement (ACK) with respect to data received from the reference terminal.

6. A data communication method, the method comprising:
   generating respective response indexes (RIs) of a plurality of terminals located in a service coverage area;
   transmitting, to the plurality of terminals, a spatio-temporal stream comprising the RIs, the RIs comprising information associated with a transmission sequence of respective responses transmitted by the plurality of terminals; and
   sequentially receiving the responses from the plurality of terminals, wherein:
   each of the plurality of terminals increases a packet count, based on a response transmitted from another terminal,
   the response is transmitted from a response terminal having an RI corresponding to the packet count, and
   if the response is not received from the response terminal, a filling packet (FP), comprising information to set the packet count to correspond to the RI of the response terminal, is transmitted to at least one of the plurality of terminals.

7. A non-transitory computer readable recording medium storing a program to implement the method of claim 6.

8. A communication system comprising:
   a plurality of terminals; and a reference terminal comprising respective response indexes (RIs) of the plurality of terminals that are transmitted to the plurality of terminals in at least one spatio-temporal stream, the RIs comprising information associated with a transmission sequence of responses to be transmitted by the plurality of terminals, wherein:

each of the plurality of terminals is configured to increase a packet count based on a response, to the transmitted stream, transmitted from another terminal;

the response is transmitted from a response terminal having an RI corresponding to the packet count; and if the response is not received from the response terminal, a filling packet (FP), comprising information to set the packet count to correspond to the RI of the response terminal, is transmitted to at least one of the plurality of terminals.

* * * * *